(12) United States Patent  (10) Patent No.: US 7,760,670 B2
Causier  (45) Date of Patent: Jul. 20, 2010

(54) COMMUNICATION APPARATUS

(75) Inventor: Stephen James Causier, Bristol (GB)

(73) Assignee: Vetco Gray Controls Limited, Bristol (GB)

( * ) Notice: Subject to any disclaimer, the term of this patent is extended or adjusted under 35 U.S.C. 154(b) by 839 days.

(21) Appl. No.: 10/982,069

(22) Filed: Nov. 5, 2004

(65) Prior Publication Data

US 2006/0055555 A1   Mar. 16, 2006

(30) Foreign Application Priority Data

Aug. 24, 2004   (GB)   ................... 0418856.1

(51) Int. Cl.
*G01V 3/00*   (2006.01)
(52) U.S. Cl. .................... 370/276; 340/853.1
(58) Field of Classification Search ................. 370/276, 370/278, 464, 465, 488, 497; 340/853.1, 340/854.3; 375/222
See application file for complete search history.

(56) References Cited

U.S. PATENT DOCUMENTS

| | | | |
|---|---|---|---|
| 4,796,026 A | | 1/1989 | Hammond |
| 5,467,083 A | | 11/1995 | McDonald et al. |
| 5,747,750 A | * | 5/1998 | Bailey et al. ............... 181/112 |
| 5,917,160 A | * | 6/1999 | Bailey ........................ 181/112 |
| 6,040,759 A | * | 3/2000 | Sanderson .................. 725/130 |
| 6,753,791 B2 | * | 6/2004 | Wei et al. .................. 340/854.9 |
| 7,046,382 B1 | * | 5/2006 | Chu .......................... 358/1.15 |
| 7,348,894 B2 | | 3/2008 | Bailey et al. |
| 2002/0101359 A1 | * | 8/2002 | Huckaba et al. .......... 340/854.9 |
| 2002/0140572 A1 | | 10/2002 | Gardner et al. |
| 2003/0155127 A1 | * | 8/2003 | Carlsen ..................... 166/368 |
| 2004/0148225 A1 | * | 7/2004 | Olafsson ..................... 705/16 |
| 2005/0193811 A1 | * | 9/2005 | Bilby et al. ............. 73/152.43 |

FOREIGN PATENT DOCUMENTS

| | | |
|---|---|---|
| WO | WO02/103944 A1 | 12/2002 |
| WO | WO03/007020 A1 | 1/2003 |
| WO | WO03/101047 A3 | 12/2003 |

OTHER PUBLICATIONS

"KOS 200. The Subsea Control System for the Millenium", S. Corneliussen. FMC Kongsberg Subsea. pp. 111-121.
"Diplexer Design Notes", Rick Karlquist, Nov. 13, 2002, three pages.
"Application of High-Speed Modem Technology to Offshore Communication and Control", J.A. Sills, H.C. Blankenship, B.C. Brown, R.G. Fenske—OTC 8482, pp. 443-450.

* cited by examiner

*Primary Examiner*—Brian D Nguyen
(74) *Attorney, Agent, or Firm*—Bracewell & Giuliani LLP

(57) ABSTRACT

A communication system transmits data in a control system for an underwater fluid well. A communications link is located between first and second facilities of the well. A data transmitter for transmitting data from one of the facilities to the other via the communications link has both a relatively high speed modem and a relatively low speed modem.

4 Claims, 1 Drawing Sheet

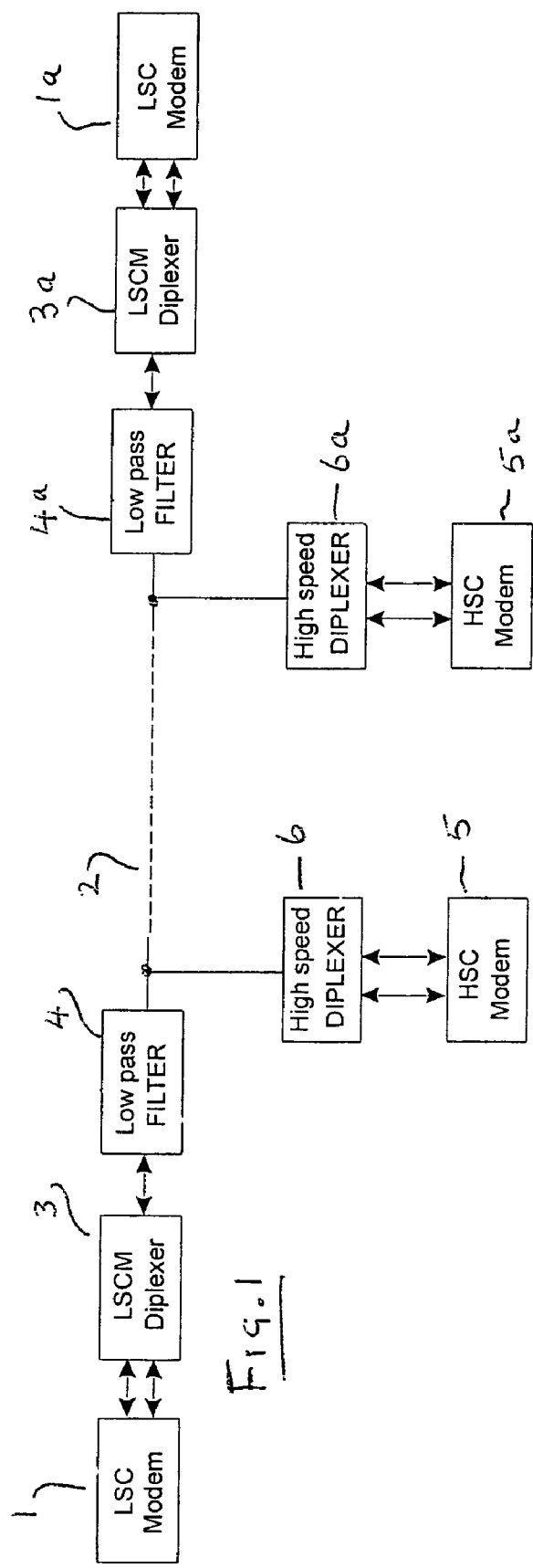
Fig. 1
Fig. 2
Fig. 3

COMMUNICATION APPARATUS

CROSS-REFERENCE TO RELATED APPLICATION

This application claims the benefit of United Kingdom Patent Application No. 0418856.1, filed on Aug. 24, 2004, which hereby is incorporated by reference in its entirety.

TECHNICAL FIELD OF THE INVENTION

The present invention relates to communication apparatus, more particularly communication apparatus for transmitting data in a control system for an underwater fluid well, such as a hydrocarbon extraction well.

BACKGROUND OF THE INVENTION

Traditionally, subsea hydrocarbon production control systems have relied upon low data rate, wire-based telemetry for communication via umbilicals connecting the surface and subsea facilities. This well-proven technology has been more than adequate for the modest update rates historically required. The use of "communications on power" (COP) offered a useful cost saving for the umbilicals.

Recently, the advent of more demanding control and instrumentation requirements for production optimisation, intelligent well systems and subsea processing has led to requirements for higher data rates—sometimes in combination with very long distance transmission.

Optical telemetry combines very high data rates over long offsets with complete noise immunity from high voltage power transmission. However, the cost is high and cannot always be justified for intermediate requirements.

Recent technical advances now permit a robust, COP, wire-based solution with a much higher data rate (115 kbits/sec) over offset distances of typically 50 km.

SUMMARY OF THE INVENTION

According to the present invention, there is provided communication apparatus for transmitting data in a control system for an underwater fluid well. A communications link locates between first and second facilities of the well. The apparatus includes a means for transmitting data from one of the facilities to the other via the communication link from both a relatively high speed modem and a relatively low speed modem.

Preferably, the apparatus is for two way operation, there being a first low speed modem and a first high speed modem at one of the facilities and a second low speed modem and a second high speed modem at the other of the facilities. One of said facilities could be a surface facility, the other being an underwater facility. Preferably, the or each low speed modem is coupled to the communications link via a respective low pass filter.

The communications link is typically an umbilical for connection between the facilities.

The present invention also comprises a control system for an underwater fluid well including apparatus according to the invention. The well could be an extraction well such as a hydrocarbon extraction well.

BRIEF DESCRIPTION OF THE DRAWINGS

The present invention will now be described, by way of example, with reference to the accompanying drawing, in which:

FIG. 1 is a schematic diagram of an embodiment of a control system according to the invention; and FIGS. 2 and 3 are respectively diagrams of a low pass filter and a diplexer of FIG. 1.

DETAILED DESCRIPTION OF THE PREFERRED EMBODIMENT

The following embodiment permits two-way high speed communication at typically 115 kbits/sec and two-way low speed communication at typically 1.2 kbits/sec, simultaneously via the same umbilical conductors, i.e. a dual band system. The invention is applicable to both conventional two wire and (COP) systems and has particular value in enhancing an existing low speed system.

Referring to FIG. 1, at for example at a surface facility in a control system for a subsea hydrocarbon extraction well, a low speed copper (LSC) modem 1 is connected to an umbilical 2 via a low speed copper modem (LSCM) diplexer 3 and a low pass filter 4. Also, a high speed copper (HSC) modem 5 is connected to the same umbilical 2 via a high speed diplexer 6. Typically, modem 1 operates at 1.2 kbits/sec and modem 5 at 115 kbits/sec. This configuration is repeated at the other end of the umbilical 2, for example at an underwater facility such as a well tree—see LSC modem 1a, diplexer 3a, low pass filter 4a, HSC modem 5a and diplexer 6a. The purpose of the diplexers 6 and 6a is to separate/combine the transmit and receive channels of the modems 5 and 5a respectively. A low speed modem and its diplexer would normally present a low impedance to the higher frequencies of a high speed modem, such that the output of the high speed modem would be unacceptably attenuated. Low pass filters 4 and 4a present a low impedance to the umbilical 2 at the lower frequencies of the LSC modems 1 and 1a, thus maximising their transmission efficiency, whilst presenting a high impedance to the higher frequencies of the HSC modems 5 and 5a and not quenching their outputs and impairing their performance.

Each of low pass filters 4 and 4a is typically passive, employing capacitors and inductors, as illustrated in FIG. 2, with values chosen to suit the operating frequency of the LSC modem 1 or 1a. The high/low frequency isolation is further enhanced by each of diplexers 6 and 6a having the configuration shown in FIG. 3. Each diplexer consists, typically, of a bifilar wound transformer having a winding coupled to the umbilical 2 via two series capacitors and two windings coupled to the respective one of HSC modems 5 and 5a—one (TX) for transmission of data and one (RX) for the reception of data. Suitable choice of the value of the capacitors ensures a low impedance to the frequency of the HSC modem whilst presenting a high impedance to the frequency of the LSC modem, thus further reducing unwanted impedance loading of the modems of the dual band system.

A major benefit of this system is the ability to operate on the same conductors of umbilical 2 as an existing low speed communication installation. Thus, more comprehensive modem instrumentation may be retrofitted to an existing infrastructure, with minimal cost and operational impact. The original low-speed system remains in place (even when provided by a different vendor), and may continue to operate alongside the high speed system. This is of particular value when an existing subsea well complex is to be upgraded or extended to include a new well field.

There are a number of permutations of configurations of communications and power arrangements for feeding along umbilical 2. They include:—

1/CAPS (Communications and power). This utilises typically a four conductor system in umbilical 2 whereby one pair of conductors carries the communications and the other pair carries the power supply separately.

2/COPS (Communications on power). This utilises typically two conductors in umbilical 2 with power and communications sharing those conductors 3/Three phase—COPS and CAPS. Some systems feed three phase AC power down the umbilical with COPS on two of the three conductors, i.e. a three conductor COPS system. Some systems also feed three phase power down the umbilical but the communications down a separate pair of conductors (CAPS) i.e. a five conductor system. The power supply can be at high voltage to enable efficient power transmission over long distances The invention is highly applicable to all of the above arrangements. For example, the communications capability of an existing four wire CAPS system would be greatly enhanced by the addition of the dual band system of this invention applied as COPS in addition to the existing communication via the dedicated communication wire pair.

The invention claimed is:

1. A control system for two-way communication for an underwater fluid well, comprising:
   first and second facilities of a well, each of the first and second facilities comprising a low speed modem and a high speed modem;
   a communications link comprising umbilical conductors extending between the first and second facilities of the well; and
   means for transmitting data simultaneously via the same umbilical conductors from one of the facilities to the other via the communications link from both a relatively high speed modem and a relatively low speed modem,
   wherein the low speed modem is coupled to the communications link via a low pass filter and a low speed diplexer and the high speed modem is coupled to the communication link via a high speed diplexer,
   wherein the umbilical conductors carry the two-way communication and power supply, and
   wherein one of said facilities is a surface facility and the other of said facilities is an underwater fluid well facility located at a seabed.

2. The control system according to claim 1, wherein the well is an extraction well.

3. The control system according to claim 1, wherein the well is a hydrocarbon extraction well.

4. The control system according to claim 1, wherein the relatively high speed modem operates at about 115 kbits/sec and wherein the relatively low speed modem operates at about 1.2 kbits/sec.

* * * * *